Oct. 6, 1964 P. E. GLASER ETAL 3,151,365
INSULATION MATERIAL AND STRUCTURES CONTAINING SAME
Filed Sept. 14, 1959

INVENTORS
PETER E. GLASER
ALFRED G. EMSLIE
WARREN A. SALMON
BY
ATTORNEY

United States Patent Office 3,151,365
Patented Oct. 6, 1964

3,151,365
INSULATION MATERIAL AND STRUCTURES CONTAINING SAME
Peter E. Glaser, Somerville, Alfred G. Emslie, Scituate, and Warren A. Salmon, Lexington, Mass., assignors to Arthur D. Little, Inc., Cambridge, Mass., a corporation of Massachusetts
Filed Sept. 14, 1959, Ser. No. 839,693
5 Claims. (Cl. 20—4)

This invention relates to insulation and more particularly to an insulating material suitable for low-temperature and high-temperature applications.

The vary marked increase in the use of liquefied gases has indicated a need for more efficient insulation systems for storing and handling these extremely cold liquids with a minimum boil-off loss due to heat leaks. At the same time recently developed techniques in industry have dictated the need for more efficient high-temperature insulation systems. For example the handling of molten materials, e.g., metals, which must be transported or stored requires extremely efficient high-temperature insulation. There are also a number of industrial processes which must be carried out at extremely high temperatures and which must be isolated for the sake of comfort, efficiency and safety.

The prior art concerned with low-temperature insulation has been directed primarily to the use of a vacuum with or without the use of an insulating material such as perlite, a finely-divided volcanic glass. However, now with the requirement that systems must be capable of the insulation of liquids the temperatures of which may approach absolute zero, it is necessary to provide an insulation system to meet such a performance requirement. Moreover, the continuing growth of activity in the cryogenic field indicates a real need for an efficient, safe insulation system.

The prior art concerned with high-temperature insulation is essentially one which has developed as the requirements have become more stringent. High-temperature insulation began essentially with packing or wrapping with a number of poor heat conductors (ceramic fibers, asbestos and the like). It proceeded then to the use of evacuated areas surrounding the high temperature area to be insulated and then to the use of evacuated panels containing insulation materials. The art has also encompassed the use of numerous constructions and designs to lengthen heat leak paths and the like. Each of these prior art systems has been essentially satisfactory in providing insulation against the temperatures for which they were designed; but the use of continually higher temperatures demands more efficient high-temperature insulation systems. Such systems suitable for insulation of temperatures up to around 1000° F. are now known, but it is now desirable to provide insulation systems which are capable of handling (i.e., furnishing protection for) temperatures of the order of 3000° F. consistent with minimum weight and density, whether the temperature difference, $\Delta T$, is small or large.

It is therefore an object of this invention to provide insulation materials, suitable for use in insulating structures, which minimize heat transmission across the structures whether the system to be insulated is at a very low temperature or a very high temperature. The term "structure" is used hereinafter to designate any enclosed space (which may or may not be evacuated) which may be filled, or partially filled, with an insulating material. Such structures include, but are not limited to panels, blankets, walls, housings and the like.

It is a further object of this invention to provide insulation materials which exhibit a relatively low density and hence a low $\rho k$ factor which is the product of density ($\rho$) times the coefficient of thermal conductivity ($k$). It is yet another object to provide an insulation system which is inexpensive and easy to prepare and use, but which can achieve a high degree of insulation even at extremely low or high temperatures, making it particularly well suited for large trucks, tank cars and the like. It is another object to provide a highly efficient insulation system which is safe for use with liquefied gases such as liquid oxygen and liquid air wherein care must be exercised to provide storage conditions not susceptible to combustion or explosions. These and other objects will become apparent in the following description of this invention.

Briefly the insulation material of this invention may be defined as a new and novel composition of matter comprising carbon black and an inorganic finely-divided solid material preferably no larger than 50 microns in two dimensions. The role of the carbon black appears to be primarily that of a radiant energy absorbing medium. Although it has been known that carbon black is an excellent absorber of radiant energy, it has never been thought possible to use this material either alone or in admixture with other materials because of the hazard of possible combustion of the carbon black. Thus, for example, in insulations designed for handling and storing liquid oxygen, where the possibility of the liquid oxygen's contacting carbon black must always be considered present, carbon black alone could not be used as an insulating material. However, contrary to what has been thought to be the case in the prior art, we have found that if the carbon black is intimately mixed with and distributed throughout an inorganic finely-divided material, it is possible to make a highly efficient insulating material which is also inert to liquid oxygen or any other combustible liquefied gas.

In a co-pending application, Serial No. 807,351, of which this is a continuation-in-part, filed in the names of Peter E. Glaser, Warren A. Salmon and Alfred G. Emslie, there was disclosed an insulation material which is comprised of three components defined as radiant energy absorbing and re-emitting particles, radiant energy reflecting and scattering particles and a carrier medium.

The insulating material formed in accordance with this invention may be used in any structural shape designed to insulate a system. When the insulating material is used in a thin-wall panel, for example, and the space within the panel evacuated, there results an extremely efficient insulation, even when the system to be insulated is at liquid helium temperatures, for example; or when the temperature differential across the panel is as much as 3000° F. in a high-temperature application. The insulating structures may be modified by having the inside surfaces thereof treated to achieve very low emissivity and they may also contain radiation shields, the latter being supported and held in proper relation within the panel by the insulating material.

This invention will be further described in the following discussion and with reference to the drawings in which.

Figure 1:
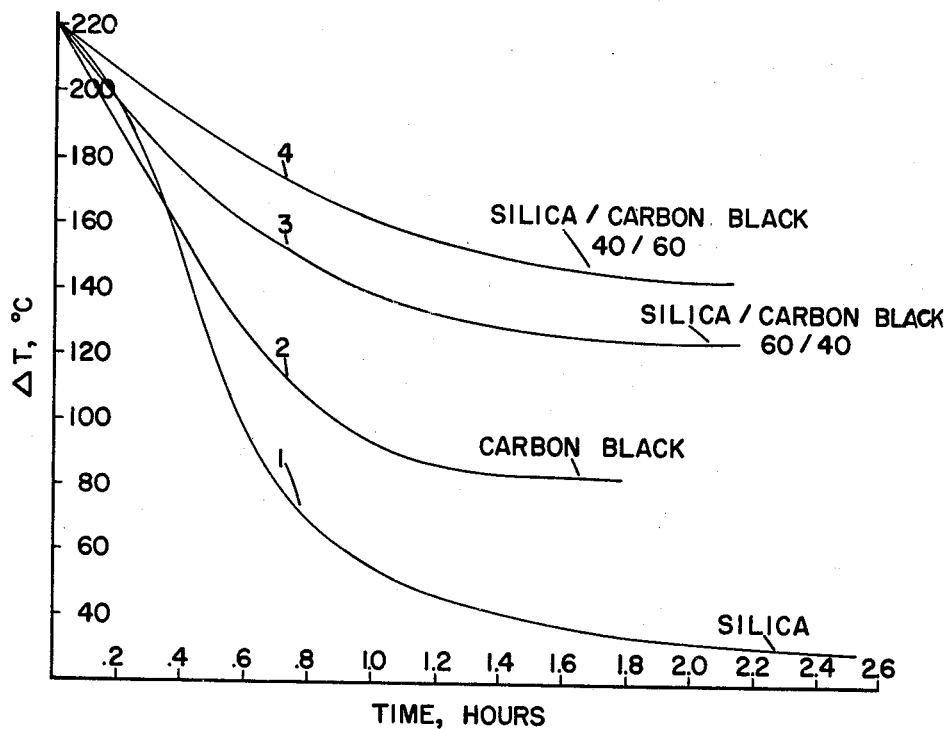
FIG. 1 is a plot showing the difference in temperature registered by a thermocouple embedded in insulation packed in an evacuated test tube and of liquid nitrogen in which the test tube is immersed.

It is known that heat is transferred by one or a combination of three processes: convection, conduction and radiation. It has long been known that heat transferred by gas convection and conduction can be materially reduced or even overcome by a high degree of evacuation. This means then that in an evacuated insulating panel heat from outside in or from inside out is transferred almost exclusively by particle conduction and radiation and that any insulating material designed to operate efficiently where the temperature difference extends up to the range of 3000° F., as in high-temperature insulation, or as much as 500° F. or even more in low-temperature insulation, must provide extremely efficient means for reducing heat transfer by particle conduction and radiation.

The kinetic theory of gases can be used to explain how fine particles become excellent insulators under vacuum. The thermal conductivity of a gas is proportional to the mean-free path of its constituent molecules and to the gas density. As the gas pressure is lowered the density decreases and the mean-free path increases until it exceeds the average particle spacing. At the lower densities, intermolecular collisions lose their importance until finally the gas molecules travel unhindered between the confining walls of the adjacent solid particles; therefore, the particle structure imposes an upper limit on the mean-free path within the insulation. As the pressure is further lowered, and more gas molecules are being removed, less heat is transferred and the thermal conductivity decreases substantially until a lower limit of thermal conductivity is obtained when virtually all gas molecules have been removed. At this lower limit, thermal conductivity still has a finite value because heat can be transferred by solid conduction through the particles and by radiation. The larger the particle spacing with a correspondingly larger mean-free path of the gas molecule, the lower the pressure has to be for the limiting value of thermal conductivity to be approached.

The insulation material of this invention is particularly well adapted to uses where a relatively high temperature difference exists across the insulation. In such cases the thermal conductivity of an evacuated insulating particle or fiber will depend upon the particle size, particle spacing, emissivity of the inside surface defining the insulation structure, thermal radiation through the solid particles and the packing density of the insulating material.

This invention is particularly concerned with the thermal radiation factor. At temperatures up to a few hundred degrees Fahrenheit the residual heat transfer across an evacuated layer is due mainly to thermal conduction along devious paths through the powdered particles. However, where large temperature differences exist, such as those for which the insulation of this invention is designed, radiation transfer through the particles and across the evacuated spaces between particles causes a high effective conductivity if steps are not taken to block the radiation.

There are several methods known for blocking radiation among which may be listed absorption, reflection and scattering. Absorption, with which at least one component of the insulating material of this invention is concerned, depends upon the attenuation of radiation by the insulation particles. This is accomplished in this invention by supplying as an insulation material extremely finely-divided carbon black particles intimately mixed with and distributed throughout an inorganic finely-divided solid material which in itself contributes to the minimizing of the thermal conductivity of the insulating material.

In choosing insulation material which will minimize heat transfer by conduction and radiation, it may be seen that the material must have certain properties. Among these are low-density, high-compressive strength, a softening point above the maximum operating temperature, and minimum contact areas between individual particles. Moreover, there should be no sintering during use. The material should be able to act as a radiation shield, the particle size should be distributed to minimize compaction and should be smaller than the mean-free path of the residual gas at the lowest operating temperature and pressure.

Although either carbon black or the inorganic finely-divided material with which it is mixed in this invention can achieve some measure of insulation alone, it would be unexpected that mixtures of the two within certain ratio ranges would prove better insulating materials than either of the single components. The results of mixing these two is a truly synergistic one and will be clearly seen in the discussion of measured results which are plotted in FIGS. 1 and 2. It should be added, furthermore, that an additional unexpected and very beneficial result is attained in mixing these two components. This is the fact that the finely-divided inorganic solid has a distinct inerting effect on the carbon black to the extent that the insulating material of this invention may be used with complete safety in containers and the like in which a combustible liquefied gas, such as oxygen, is stored.

As will be seen below, the insulating material of this invention has a low $k\rho$ factor. This latter is particularly important in providing an insulating material which can meet the requirements of aircraft structures, for example, where it is necessary to minimize the factor $k$ (coefficient of thermal conductivity) as well as the factor $k\rho$ where $\rho$ is the density.

In data to be presented in discussing the figures it will be seen that a highly efficient insulation can be made when the mixture comprises from about 20 to 80% by weight carbon black. Where, however, it is necessary to observe safety precautions in handling materials such as in the storage or transportation of liquid oxygen the amount of carbon black should not exceed about 70%.

Carbon black suitable for the practice of this invention may be described as that which varies in particle size from about 10 to 200 millimicrons. It may be any of the types of carbon blacks commonly known and used, e.g., channel blacks, furnace blacks or thermal blacks.

The role of the other non-carbon black component is not completely understood nor is it known precisely why the combination of the carbon black and the inorganic solid achieves better insulation (i.e., has a markedly lower thermal conductivity) than either one alone or what would be thought to be the performance of a mixture of them. However, it may be concluded that the finely-divided inorganic solid material, which is inert to carbon black, serves more than a supporting structure for the carbon black, even though this is apparently one of its functions. Moreover, in addition to offering some physical support to the carbon black particles, the inorganic material serves to distribute the carbon black evenly throughout the insulation and in insulating structures where one side or skin acts only as a vacuum barrier the insulating material of this invention may be used to transmit loads to an underlying load-carrying system.

The second, or non-carbon black, component may be defined as a finely-divided inorganic material which is inert to carbon black. If the insulation material is to be used for high-temperature applications, it should have a melting point above about 3000° F. Moreover, it is preferable that it have a fairly loose density ranging from about 3 to 25 pounds per cubic foot and be essentially non-hygroscopic in character. The latter characteristic is desirable since it has been found preferable to dry the insulation material before evacuation of the structure in which it is used. An essentially non-hygroscopic material would therefore minimize the time and effort involved in drying the insulating material.

A preferred inorganic finely-divided component is a finely-divided silica, i.e., one which has a particle size of about 200 A. or less. However, it is possible to use fine glass fibers or other fibers of mineral origin provided that these materials are not larger than about 50 microns in two dimensions.

Inasmuch as the amount of carbon black has been specified as ranging between about 20% and 80% by weight, the non-carbon black or finely-divided inorganic solid component will correspondingly range from about 80% to 20% by weight of the insulating material.

Turning to FIG. 1 it will be seen how an insulating material consisting of an intimate mixture of carbon black and a commercially available finely-divided silica as the finely-divided inorganic component achieves a performance markedly better than either of these materials used alone. In obtaining the data of FIG. 1 the insulating material sample was packed in a test tube and a thermocouple was inserted in the center of the insulation. The test tube was sealed and evacuated and then immersed in liquid nitrogen. The curves in FIG. 1 represent the difference in temperature in °C., between the temperature within the test tube as measured by the thermocouple and the temperature of the liquid nitrogen. It will be seen that in curve 1, which represents the performance of finely-divided silica alone, the temperature within the insulation dropped very rapidly at first and then the temperature difference leveled off to about 30° C. The silica used was a finely-divided material, most of the particles of which ranged from about 10 to 40 millimicrons while the maximum size did not exceed about 100 millimicrons. This silica may be further characterized as pyrogenic silica formed by a flame process by the hydrolysis of a silicon halide.

Curve 2 represents performance of a carbon black alone of average particle size of about 29 millimicrons. Allthough the carbon black was somewhat better as an insulating material than all silica, its performance was inferior to that of a combination of the two in which the insulation material consisted of 60% of the silica of curve 1 and 40% of the carbon black (curve 3). In this case the temperature difference leveled off at approximately 125° C. Curve 4, representing the performance of a mixture of 40% of the same silica and 60% carbon black, shows an even better performance, for the temperature difference dropped very slowly and leveled off at about 140° C.

The effect of combining carbon black and silica to form an insulating material is unexpected. This effect is further illustrated in FIG. 2. In this case the same test setup was used as that employed to obtain the data to plot FIG. 1. The same form of silica used to obtain the data in curve 1 of FIG. 1 was used and 0% carbon black in FIG. 2 is equivalent to 100% silica.

Figure 2:
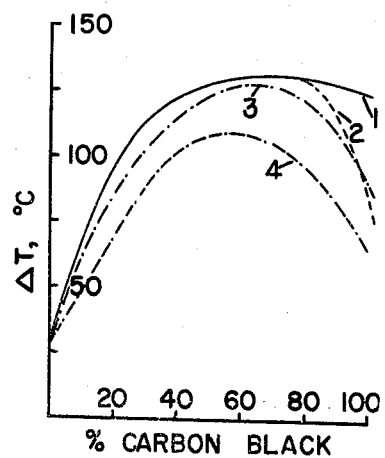
FIG. 2 is a plot showing the degree of thermal insulation attained by mixtures of carbon black and a finely-divided silica when the amount of carbon black is varied from 0 to 100% by weight.

The purpose of FIG. 2 is to illustrate both the range of carbon black which can be used and the effect of carbon black particle size on insulation performance. In this figure curves 1 through 4 are arranged in order of corresponding particle size. In curve 1 the carbon black averaged about 12 millimicrons, in curve 2 about 29, curve 3 about 41 and curve 4 about 180. Examination of the four curves of FIG. 2 shows that there is a percentage composition range of carbon black and silica which produces an insulation more effective than either of the components alone. Moreover, these curves clearly indicate the synergistic effect achieved by the mixture. Absent this synergistic effect, these curves of FIG. 2 should be essentially straight lines. It will be seen from this that the carbon black content may range from about 20 to 80% by weight and preferably from about 40 to 80% by weight. However, where safety precautions are required, it is recommended that these ranges be from about 20 to 70% and from about 40 to 70%, respectively.

Figure 3:
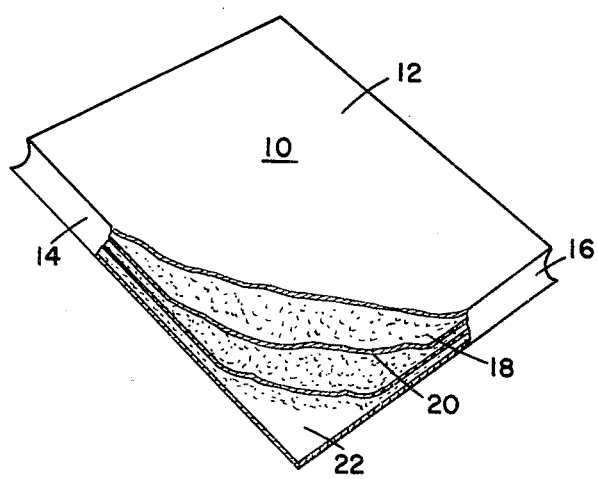
FIG. 3 shows a typical insulating panel (partly in cutaway view) in which the insulating material of this invention may be used.

FIG. 3 illustrates a typical insulating structure containing the insulating material of this invention. The thin-skin evacuated panel of FIG. 3 is used as a typical illustration of an insulation structure as defined above.

In FIG. 3 a thin wall panel 10 is made up of an upper and lower sheet 12 and 14, respectively, joined by a suitable joining strip 16. The insulating material 18 of this invention may be introduced into the panel by any suitable means, and the panel evacuated by methods known in the art. FIG. 3 also illustrates how one or more thin radiation shields 20, located in the panel, may be separated and held in place by the insulating material. Such radiation shields 20 may be of thin aluminum, gold, silver, rhodium or similar refractory metal foil. Finally, the inside surface, such as 22, of the panels may be treated as by plating with silver to reduce the emissivity of these surfaces to a minimum. A suitable treatment for forming very low emissivity surfaces is described in U.S. Patent 2,776,069.

Measurements were made to determine the thermal conductivity, $k$, of the insulation material of this invention. In making measurements, the insulation material to be evacuated was placed in a single guarded cold plate apparatus, the emissivities of the hot and cold plates were 0.86 and the temperature of the cold plate was −320° F. while that of the hot plate was about 50° F. The insulation materials were packed to the densities indicated and evacuated to less than $10^{-6}$ mm. Hg.

| Insulating Material | Density, pounds/ft.$^3$ | Apparent k, B.t.u.-in./hr.-ft.$^2$, ° F. |
| --- | --- | --- |
| Silica[a], alone | 3.5 | .0100 |
| Silica/Carbon Black, 75/25[b] | 5 | .0046 |
| Silica/Carbon Black 40/60 | 5 | .0057 |
| Commercial perlite | 10 | .0105 |
| Commercial-grade silica | 6 | .0124 |

[a] The silica used was a pyrogenic silica, the major portion ranging in size from 10 to 40 millimicrons.
[b] Composition ratios given in weight percent.

In the tabulation, the type of insulating material representing the prior art is illustrated by the data below the line. The perlite used was of such a size that between about 70 and 95% was retained on a standard 50-mesh sieve. The commercial grade silica was Santocel (sold by Monsanto Chemical Company) and ranged from five to fairly coarse in particle size.

The data in the tabulation shows that the commercially available perlite (finely-divided volcanic glass) had an apparent k value about 2.3 times greater than the 75/25 silica/carbon black mixture, while the comparable factor for the commercial silica was 2.7.

Moreover, it should be pointed out that when the data for the two silica/carbon black mixtures are extrapolated, a 30/70 mixture should have an apparent k value of 0.0025.

In general, in the process of insulating a body (e.g., a container of liquid oxygen) in accordance with this invention, the insulating structure such as the shell of a tank car is filled with the insulating material, as decribed and defined above, to the density desired and then, preferably, substantially all of the moisture associated with the insulating material is removed before the structure is evacuated. Moisture removal is accomplished by any known technique, such as baking at 300° F.

It will be seen from the above description and discussion that the insulation material of this invention makes it possible to reduce the coefficient of thermal conductivity across an insulating structure and thus to achieve a high degree of insulation.

We claim:
1. Insulation comprising an enclosed structure containing therein an insulation material consisting of carbon black ranging in particle size from 10 to 200 millimicrons and silica substantially all of the particles of which are sized between about 10 to 40 millimicrons.
2. Insulation in accordance with claim 1 further characterized by being evacuated.
3. Insulation in accordance with claim 1 wherein said enclosed structure is a thin-skin vacuum panel.

4. Insulating material consisting of an intimate physical mixture of carbon black present in an amount equivalent to from about 20 to 80% by weight of the mixture and sized between 10 and 200 millimicrons, and an inorganic finely-divided solid material no larger than 50 microns in two dimensions, wherein said inorganic solid material is a pyrogenic silica.

5. Insulating material consisting of an intimate physical mixture of carbon black present in an amount equivalent to from about 20 to 80% by weight of the mixture and sized between 10 and 200 millimicrons, and an inorganic finely-divided solid material no larger than 50 microns in two dimensions wherein said inorganic solid material is a finely-divided silica substantially all of the particles of which are sized between about 10 and 40 millimicrons.

References Cited in the file of this patent

UNITED STATES PATENTS

| | | |
|---|---|---|
| 144,232 | Spiller | Nov. 4, 1873 |
| 2,700,633 | Bovenkerk | Jan. 25, 1955 |
| 2,808,338 | Bruno | Oct. 1, 1957 |
| 2,890,173 | Ford | June 9, 1959 |
| 2,967,152 | Matsch | Jan. 3, 1961 |

FOREIGN PATENTS

| | | |
|---|---|---|
| 104,448 | Australia | 1938 |
| 549,675 | Canada | 1957 |